(12) United States Patent
Arakawa et al.

(10) Patent No.: US 11,110,894 B2
(45) Date of Patent: Sep. 7, 2021

(54) CAR SHARING SYSTEM

(71) Applicants: KABUSHIKI KAISHA TOKAI RIKA DENKI SEISAKUSHO, Aichi (JP); TOYOTA JIDOSHA KABUSHIKI KAISHA, Aichi-ken (JP)

(72) Inventors: Masahiro Arakawa, Aichi (JP); Masahiko Oya, Aichi (JP); Masaki Oshima, Aichi (JP); Yuichiro Haruna, Oyama (JP)

(73) Assignees: KABUSHIKI KAISHA TOKAI RIKA DENKI SEISAKUSHO, Aichi (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/647,221

(22) PCT Filed: Aug. 28, 2018

(86) PCT No.: PCT/JP2018/031815
§ 371 (c)(1),
(2) Date: Mar. 13, 2020

(87) PCT Pub. No.: WO2019/058900
PCT Pub. Date: Mar. 28, 2019

(65) Prior Publication Data
US 2021/0146885 A1 May 20, 2021

(30) Foreign Application Priority Data
Sep. 20, 2017 (JP) .............................. JP2017-180535

(51) Int. Cl.
*B60R 25/34* (2013.01)
*B60R 25/24* (2013.01)

(52) U.S. Cl.
CPC .......... *B60R 25/246* (2013.01); *B60R 25/243* (2013.01); *B60R 25/34* (2013.01);
(Continued)

(58) Field of Classification Search
CPC ..... B60R 25/246; B60R 25/34; B60R 25/243; B60R 2325/205; B60R 2325/105;
(Continued)

(56) References Cited

U.S. PATENT DOCUMENTS 10,984,616 B2 * 4/2021 Arakawa .................. G07C 9/22
2006/0255908 A1 * 11/2006 Gilbert .................... B60R 25/24
340/5.61

(Continued)

FOREIGN PATENT DOCUMENTS

JP     2016-071834 A     5/2016
JP     2016-115077 A     6/2016

OTHER PUBLICATIONS

International Search Report, dated Dec. 4, 2018 by the Japan Patent Office (JPO), in International Application No. PCT/JP2018/031815.

*Primary Examiner* — Edwin C Holloway, III
(74) *Attorney, Agent, or Firm* — Greenblum & Bernstein, P.L.C.

(57) ABSTRACT

A car sharing system includes a car sharing device that actuates an onboard device by performing communication with an electronic key system through ID verification when a user operates the onboard device in an authentication completion state in which key information has been authenticated through wireless communication with the portable terminal, a radio wave checker that checks radio waves transmitted from the electronic key system in accordance with a state of a vehicle power supply when the onboard device is operated with the portable terminal and a key control request corresponding to the operation with the (Continued)

portable terminal is transmitted from the portable terminal to the car sharing device so that the car sharing device actuates the electronic key system, and a warning controller that issues a warning indicating that one has forgotten to stop the vehicle power supply in accordance with a checking result of the radio wave checker.

6 Claims, 4 Drawing Sheets

(52) U.S. Cl.
CPC ... *B60R 2325/103* (2013.01); *B60R 2325/105* (2013.01); *B60R 2325/205* (2013.01)

(58) Field of Classification Search
CPC .......... B60R 2325/103; B60R 25/1018; B60R 25/2009; B60R 25/2018; B60R 25/24; B60R 25/241; B60R 25/245

USPC ...................... 340/426.14, 426.15, 457, 5.72
See application file for complete search history.

(56) References Cited

U.S. PATENT DOCUMENTS

| | | | | |
|---|---|---|---|---|
| 2008/0157919 | A1* | 7/2008 | Sugiura | B60R 25/24 |
| | | | | 340/5.61 |
| 2010/0231369 | A1* | 9/2010 | Oya | B60R 25/00 |
| | | | | 340/426.11 |
| 2011/0140839 | A1* | 6/2011 | DiSalvo | B60R 25/245 |
| | | | | 340/5.61 |
| 2012/0280791 | A1* | 11/2012 | Kim | G07C 9/00309 |
| | | | | 340/5.72 |
| 2016/0098870 | A1* | 4/2016 | Bergerhoff | B60R 25/2018 |
| | | | | 340/5.61 |
| 2017/0278329 | A1* | 9/2017 | Konishi | G06Q 50/10 |
| 2019/0197808 | A1* | 6/2019 | Jinnai | B60R 25/102 |
| 2019/0202404 | A1* | 7/2019 | Atsumi | B60R 25/241 |

\* cited by examiner

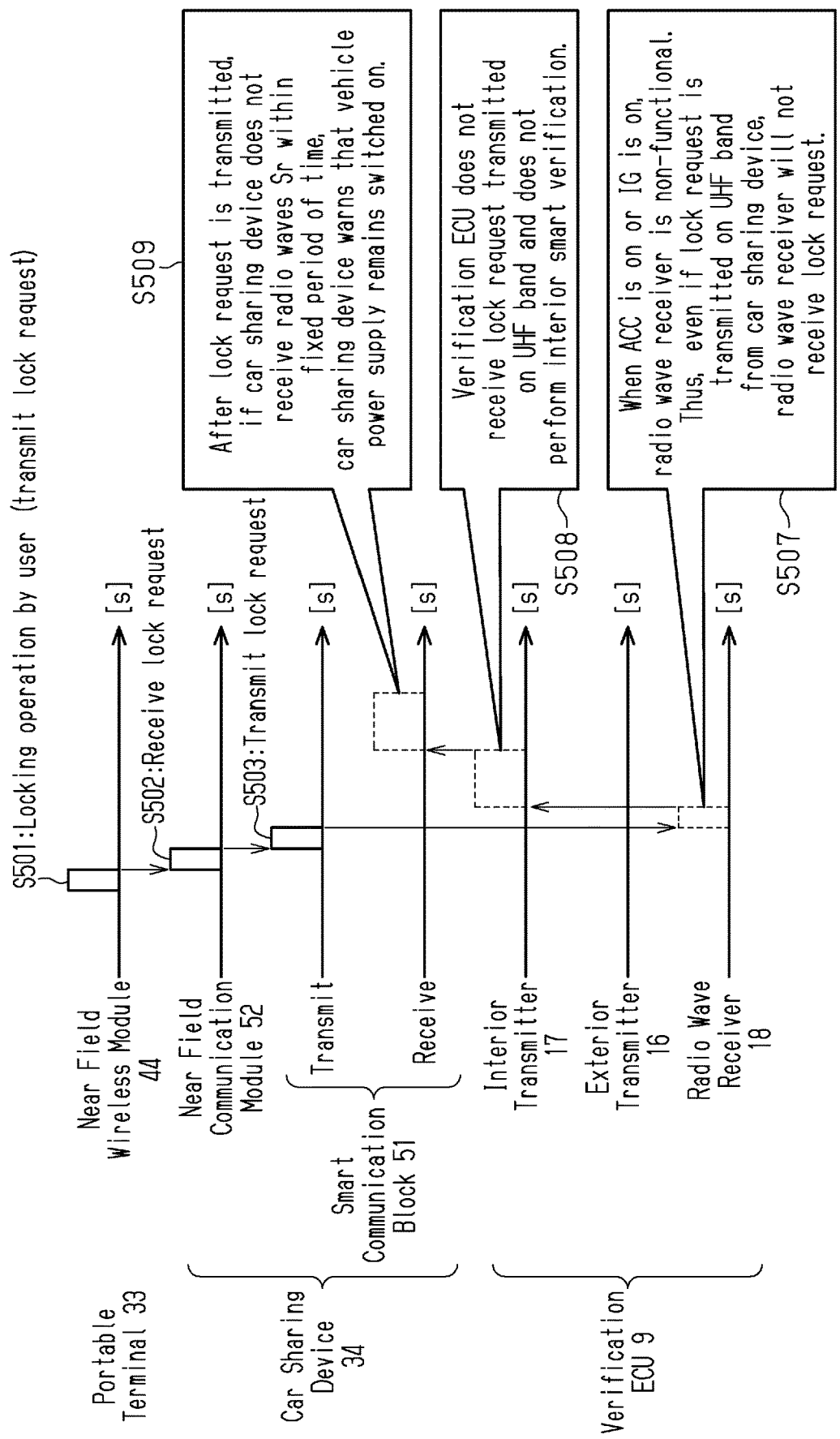

CAR SHARING SYSTEM

TECHNICAL FIELD

The present invention relates to a car sharing system for sharing a vehicle with users.

BACKGROUND ART

A known car sharing system shares a vehicle with users (refer to Patent Documents 1 and 2). The car sharing system has a server to which users are registered in advance to use of the car sharing. A user reserves a vehicle with a portable terminal (smartphone or the like), and the car sharing system permits the user to use the vehicle during the reserved time.

PRIOR ART DOCUMENTS

Patent Documents

Patent Document 1: Japanese Laid-Open Patent Publication No. 2016-115077
Patent Document 2: Japanese Laid-Open Patent Publication No. 2016-71834

SUMMARY OF THE INVENTION

When the portable terminal is used as a vehicle key, the user may, for example, leave the vehicle with the portable terminal without stopping the engine of the vehicle. A conventional vehicle has an exterior electronic key locating function that detects when the electronic key is located outside the vehicle when the engine is running. However, the exterior electronic key locating function is not used in cooperation with the portable terminal. Thus, the portable terminal cannot be detected when located outside the vehicle. In particular, hybrid vehicles and electric vehicles do not produce engine noise. If the user exits a hybrid vehicle or an electric vehicle, it may be difficult for the user to recognize that the engine is running in which case the user may easily forget to stop the engine.

It is an objective of the present invention to provide a car sharing system that notifies a user that the user has forgotten to stop a vehicle power supply.

In one aspect of the present invention, a car sharing system includes a car sharing device that actuates an onboard device by performing communication with an onboard electronic key system through ID verification when a user operates the onboard device in an authentication completion state in which key information, registered to a portable terminal so that the portable terminal can be actuated as a vehicle key of a shared vehicle, has been authenticated through wireless communication with the portable terminal, a radio wave checker that checks radio waves transmitted from the electronic key system in accordance with a state of a vehicle power supply when the onboard device is operated with the portable terminal and a key control request corresponding to the operation with the portable terminal by the user is transmitted from the portable terminal to the car sharing device so that the car sharing device actuates the electronic key system, and a warning controller that issues a warning indicating that one has forgotten to stop the vehicle power supply in accordance with a checking result of the radio wave checker.

With this structure, when the user operates the onboard device with the portable terminal, a key control request is transmitted from the portable terminal to the car sharing device, and the car sharing device cooperates with the electronic key system in accordance with the key control request to actuate the onboard device. During the actuation, the car sharing device checks radio waves by using the radio waves transmitted from the electronic key system in accordance with the state of the vehicle power supply. Thus, even when the user operates the onboard device with the portable terminal, the state of the vehicle power supply can be indirectly determined. If detected that one has forgotten to stop the vehicle power supply, a warning is issued to indicate such a situation. This allows the user to be notified that he or she has forgotten to stop the vehicle power supply.

In the car sharing system, the car sharing device might not be wire-connected to the electronic key system and may actuate the electronic key system through wireless communication. With this structure, the car sharing device can easily be retrofitted to the vehicle.

In the car sharing system, the key control request may be a lock request that is a request for locking a vehicle door. With this structure, the user can check whether the vehicle power supply has been switched off when performing a locking operation on the vehicle door with the portable terminal. Thus, the user will not leave the power supply state switched with the vehicle door locked.

In the car sharing system, the radio waves may be transmitted from an onboard interior transmitter when a locking operation is performed on a vehicle door. With this structure, the state of the vehicle power supply is determined using radio waves that are stably formed by the interior transmitter inside the vehicle.

In the car sharing system, the radio waves may be transmitted from the interior transmitter when the vehicle power supply is in an IG-off state, and the radio waves may not be transmitted from the interior transmitter when the vehicle power supply is in an ACC-on state or an IG-on state. With this structure, the car sharing device determines whether the vehicle power supply is in the IG-off state, or in the ACC-on state or the IG-on state by checking whether the car sharing device can receive the radio waves transmitted from the interior transmitter.

In the car sharing system, a series of processes for monitoring the radio waves and issuing a warning indicating that one has forgotten to stop the vehicle power supply may be performed using an interior electronic key detection function included in advance in the electronic key system. This structure allows for detection of a situation in which one has forgotten to stop the vehicle power supply when the user operates the onboard device with the portable terminal without the need to add a new component.

The present invention notifies a user that the user has forgotten to stop a vehicle power supply.

BRIEF DESCRIPTION OF THE DRAWINGS

FIG. 4 is a timing chart illustrating vehicle power supply state determination when ACC is on or IG is on.

MODES FOR CARRYING OUT THE INVENTION

A car sharing system according to one embodiment will now be described with reference to FIGS. 1 to 4.

Figure 1:
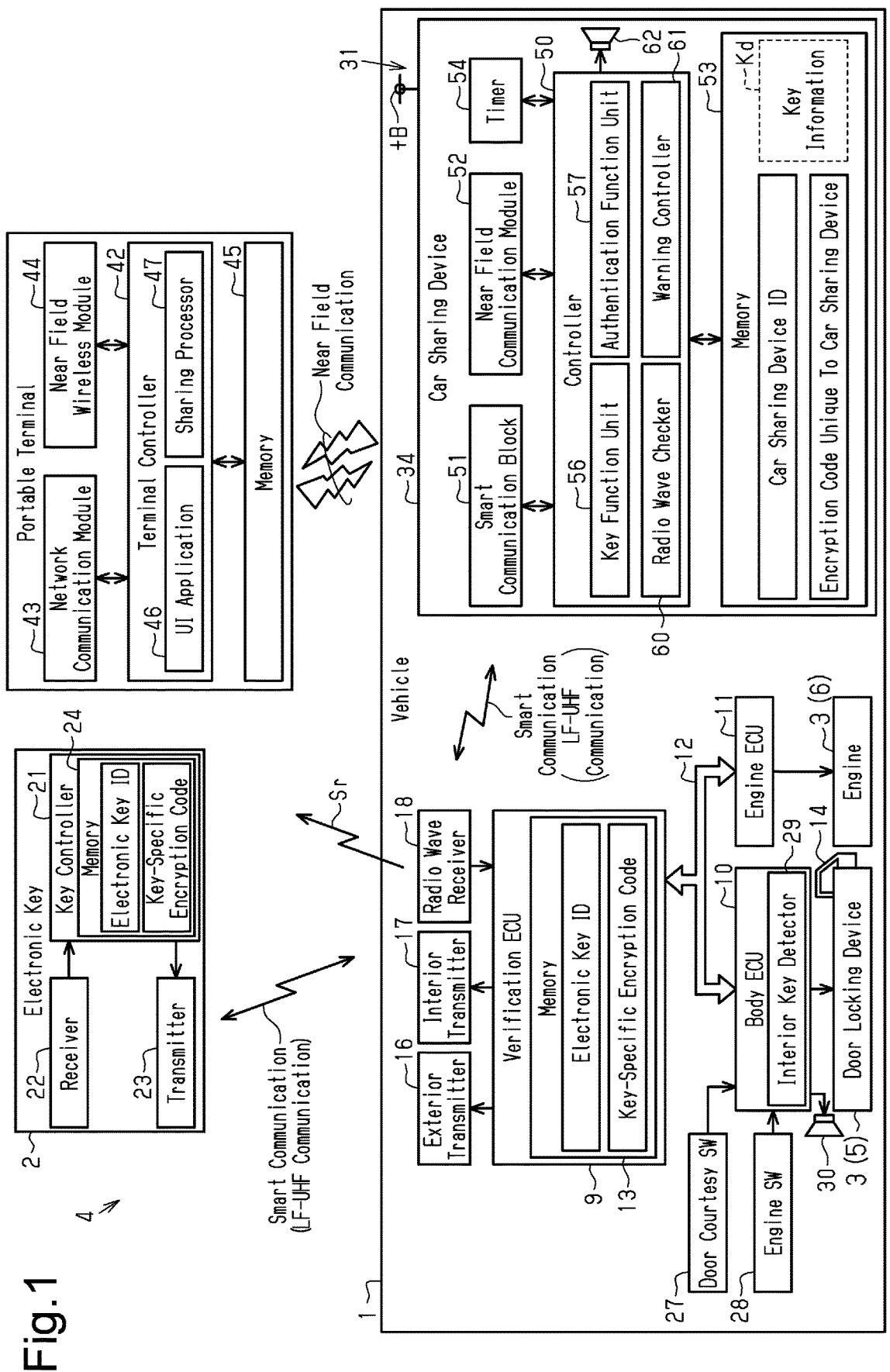
FIG. 1 is a diagram illustrating the configuration of a car sharing system according to one embodiment.

As shown in FIG. 1, an electronic key system 4 performs ID verification of a vehicle 1 (shared vehicle) and an electronic key 2 through wireless communications. The electronic key system 4 actuates or permits the actuation of an onboard device 3 if the ID verification is successful. The electronic key system 4 is a key-operation-free system that performs ID verification through short-range wireless communications when communication is established with the vehicle 1. The key-operation-free system automatically performs ID verification (smart verification) without the electronic key 2 being directly operated. The onboard device 3 includes, for example, a door locking device 5 and an engine 6.

The vehicle 1 includes a verification electronic control unit 9 (ECU) that performs ID verification, a body ECU 10 that manages power supply for onboard electric components, and an engine ECU 11 that controls the engine 6. The ECUs are electrically connected to one another through an interior communication line 12. The communication line 12 may be a controller area network (CAN) or a local interconnect network (LIN). The verification ECU 9 includes a memory 13 that stores an electronic key ID of the electronic key 2. The vehicle 1 registers the electronic key 2 that includes the stored electronic key ID. The body ECU 10 controls the door locking device 5 that locks and unlocks a vehicle door 14.

The vehicle 1 includes an exterior transmitter 16 that is configured to transmit radio waves outside the vehicle, an interior transmitter 17 that is configured to transmit radio waves inside the vehicle, and a radio wave receiver 18 that is configured to receive radio waves in the vehicle 1. The exterior transmitter 16 and the interior transmitter 17 transmit radio waves on the low frequency (LF) band. The radio wave receiver 18 receives radio waves on the ultra-high frequency (UHF) band. That is, the electronic key system 4 performs bidirectional communication to transmit radio wave on the LF band and receive radio wave on the UHF band. When the vehicle power supply is switched off, the radio wave receiver 18 is functional (radio waves receivable). When the vehicle power supply is switched on (for example, ACC-on state or IG-on state), the radio wave receiver 18 is non-functional (radio waves non-receivable).

The electronic key 2 includes a key controller 21 that controls actuation of the electronic key 2, a receiver 22 that receives radio waves in the electronic key 2, and a transmitter 23 that transmits radio waves from the electronic key 2. The receiver 22 is configured to receive LF radio waves. The transmitter 23 is configured to transmit UHF radio waves. The key controller 21 includes a memory 24 that stores an electronic key ID unique to the electronic key 2.

When the vehicle is parked (vehicle door 14 locked and vehicle power supply switched off), the exterior transmitter 16 transmits a wake signal for activating the electronic key 2 on LF radio waves. As the electronic key 2 enters the communication area of the wake signal and receives the wake signal, the electronic key 2 is activated from the standby state. In this case, the verification ECU 9 starts ID verification (exterior smart verification) with the activated electronic key 2. The smart verification includes, for example, electronic key ID verification for determining whether the electronic key ID is correct and challenge-response authentication using a key-specific encryption code (encryption code). If such verification and authentication are accomplished, the verification ECU 9 determines that ID verification was successful and permits the body ECU 10 to lock or unlock the vehicle door 14.

If the verification ECU 9 detects with, for example, a door courtesy switch 27 that a user has entered the vehicle, the verification ECU 9 transmits a wake signal from the interior transmitter 17 instead of the exterior transmitter 16. When the electronic key 2 receives the wake signal, ID verification (interior smart verification) starts in the same manner as the exterior smart verification. If the verification ECU 9 determines that the interior smart verification was successful, the verification ECU 9 permits an engine switch 28 arranged near the driver seat to shift a power supply state (engine start operation).

The electronic key system 4 includes an interior electronic key detection function that detects whether the electronic key 2 has been left in the vehicle when the user performs a locking operation on the vehicle door 14. In this example, the body ECU 10 includes an interior key detector 29 that implements the interior electronic key detection function. The interior key detector 29 performs interior smart verification when the user performs a locking operation on the vehicle door 14. The locking operation of the vehicle door 14 is performed by operating a lock button, for example, arranged on the exterior door handle of the vehicle door 14. In this case, if the interior smart verification is successful, the interior key detector 29 determines that the electronic key 2 has been left in the vehicle and issues a warning that the electronic key 2 has been left in the vehicle without locking the vehicle door 14. The warning of the electronic key 2 being left is output by, for example, an onboard warning unit 30. The warning unit 30 includes a buzzer, a loudspeaker, or the like.

A car sharing system 31 shares a single vehicle 1 with a number of users. In the car sharing system 31 of this example, a portable terminal 33 functions as a vehicle key (electronic key) and registers encrypted key information Kd that is transmitted from a server (not shown). A car sharing device 34 installed in the vehicle 1 includes an encryption code (encryption code unique to car sharing device) that decrypts the key information Kd. In the car sharing system 31, the portable terminal 33 transmits the key information Kd to the vehicle 1, and the car sharing device 34 of the car sharing system 31 receives and authenticates the key information Kd. If the authentication by the car sharing device 34 is successful, operation of the onboard device 3 is permitted.

The car sharing device 34 is separate from the hardware structure of the electronic key system 4 of the vehicle 1 and can be retrofitted to the vehicle 1. The car sharing device 34 serves as an electronic key that is valid only, for example, during a reserved time. That is, the car sharing device 34 serves as a spare key. The car sharing device 34 is supplied with power from a battery +B of the vehicle 1.

The portable terminal 33 includes a terminal controller 42 that controls actuation of the portable terminal 33, a network communication module 43 that enables network communication of the portable terminal 33, a near field wireless module 44 that enables near field communication of the portable terminal 33, and a memory 45 that allows data to be rewritten. The memory 45 of the portable terminal 33 stores an encryption code for user authentication that is used when near field communication is performed with the car sharing device 34 through encrypted communication. The near field communication may be Bluetooth (registered trademark), and the user authentication encryption code may be a random number that is changed whenever generated. The user authentication encryption code may be registered in advance to the car sharing system 31 or may be generated and registered to members required when the vehicle is used.

The terminal controller 42 of the portable terminal 33 includes a user interface application 46 that manages actuation of the car sharing system 31 in the portable terminal 33 and a sharing processor 47 that performs a process for sharing the vehicle 1 in the portable terminal 33. The sharing processor 47 is functionally configured, for example, when a controller 50 executes the user interface application 46.

The car sharing device 34 includes the controller 50 that controls actuation of the car sharing device 34, a smart communication block 51 that enables smart communication of the car sharing device 34, a near field communication module 52 that enables near field communication of the car sharing device 34, a memory 53 that allows data to be rewritten, and a timer 54 that manages the date and time in the car sharing device 34. The memory 53 stores a car sharing device ID and an encryption code unique to a car sharing device written in advance. The timer 54 may be a software timer.

The memory 53 of the car sharing device 34 stores key information Kd. The key information Kd is generated by, for example, a server (not shown). In this case, the car sharing device 34 receives the key information Kd from the server via the portable terminal 33 and registers the key information Kd. The key information Kd is configured by information that is allowed to be used only temporarily and may be a one-time key that is allowed to be used only once.

The car sharing device 34 includes a key function unit 56 that performs ID verification (smart verification in this example) through the smart communication block 51 via a communication network of the car sharing device 34. The key function unit 56 is included in the controller 50. That is, the car sharing device 34 may include the key function unit 56. The key function unit 56 sets the onboard device 3 of the vehicle 1, which is shared by a number of users, to be operable through ID verification performed through the same process as the electronic key 2.

The car sharing device 34 includes a user authentication function unit 57 that communicates with the portable terminal 33 when the user remotely operates the onboard device 3 with the portable terminal 33. The user authentication function unit 57 is included in the controller 50. The user authentication function unit 57 switches the key function unit 56 between valid and invalid states. Part of the electronic key system 4 (verification ECU 9) in the vehicle 1 recognizes the appearance and disappearance of an electronic key in the vehicle in correspondence with the validation and invalidation of the key function unit 56. When the user operates the onboard device 3 with, for example, the portable terminal 33, the user authentication function unit 57 obtains key information Kd, which is externally generated (by server in this example), via the portable terminal 33. If authentication of the obtained key information Kd is successful and the usage is within the reserved time, the user authentication function unit 57 validates the key function unit 56 and permits operation of the onboard device 3.

The car sharing system 31 functions to notify the user that the user has forgotten to stop the vehicle power supply when the user leaves the vehicle with the portable terminal 33 without stopping the vehicle power supply. The radio wave receiver 18 of the electronic key system 4 becomes functional when the vehicle power supply is switched off and non-functional when the vehicle power supply is switched on (ACC-on state, IG-on state). Taking this into consideration, in this example, the car sharing system 31 determines whether smart communication has been established between the verification ECU 9 and the car sharing device 34 and determines an on/off state of the vehicle power supply from the determination result. In particular, in the present example, the function for detecting that one has forgotten to stop the vehicle power supply uses the interior electronic key detection function to determine the on/off state of the vehicle power supply.

In this example, the car sharing system 31 includes a radio wave checker 60 that checks radio waves Sr transmitted from the electronic key system 4 in a series of actuation processes for operating the onboard device 3 with the portable terminal 33. The radio wave checker 60 is included in the controller 50. That is, the car sharing device 34 may include the radio wave checker 60. When the user operates the onboard device 3 with the portable terminal 33, the portable terminal 33 transmits a corresponding key control request to the car sharing device 34, and the car sharing device 34 actuates the electronic key system 4 in accordance with the received key control request. When the user operates the onboard device 3 with the portable terminal 33, the radio wave checker 60 of this example checks the radio waves Sr that are transmitted from the electronic key system 4 in accordance with the state of the vehicle power supply. Radio waves Sr are, for example, transmitted or not transmitted from the electronic key system 4 depending on the state of the vehicle power supply. In this example, when the user operates the onboard device 3 with the portable terminal 33, radio waves Sr are not transmitted from the electronic key system 4 if the vehicle power supply is switched on, and radio waves Sr are transmitted from the electronic key system 4 if the vehicle power supply is switched off. In another example, when the user operates the onboard device 3 with the portable terminal 33, radio waves Sr may be transmitted from the electronic key system 4 if the vehicle power supply is switched on, and radio waves Sr do not need to be transmitted from the electronic key system 4 if the vehicle power supply is switched off. In this manner, when the user operates the onboard device 3 with the portable terminal 33, the radio wave checker 60 checks radio waves Sr and determines the state of the vehicle power supply.

In this example, specifically, the key control request is a lock request that is a request for locking the vehicle door 14, and radio waves Sr are transmitted from the interior transmitter 17 to determine whether the electronic key 2 is present in the vehicle when locking the vehicle door 14. Radio waves Sr are transmitted from the interior transmitter 17 when the vehicle power supply is in an IG-off state. Radio waves Sr are not transmitted from the interior transmitter 17 when the vehicle power supply is in an ACC-on state or an IG-on state. Radio waves Sr may be a wake signal that activates the car sharing device 34 in a standby state or a challenge code that is transmitted for challenge-response authentication with the car sharing device 34.

The car sharing system 31 includes a warning controller 61 that issues a warning indicating that one has forgotten to stop the vehicle power supply in accordance with the checking result of the radio wave checker 60. The warning controller 61 is included in the controller 50. That is, the car sharing device 34 may include the warning controller 61. When, for example, locking the vehicle door 14, if the vehicle power supply has not been stopped (e.g., ACC-on state, IG-on state), the warning controller 61 issues a warning indicating that one has forgotten to stop the vehicle power supply. The warning indicating that one has forgotten to stop the vehicle power supply is output by, for example, the warning unit 30 or a warning unit 62 that is installed in the car sharing device 34.

Figure 2:
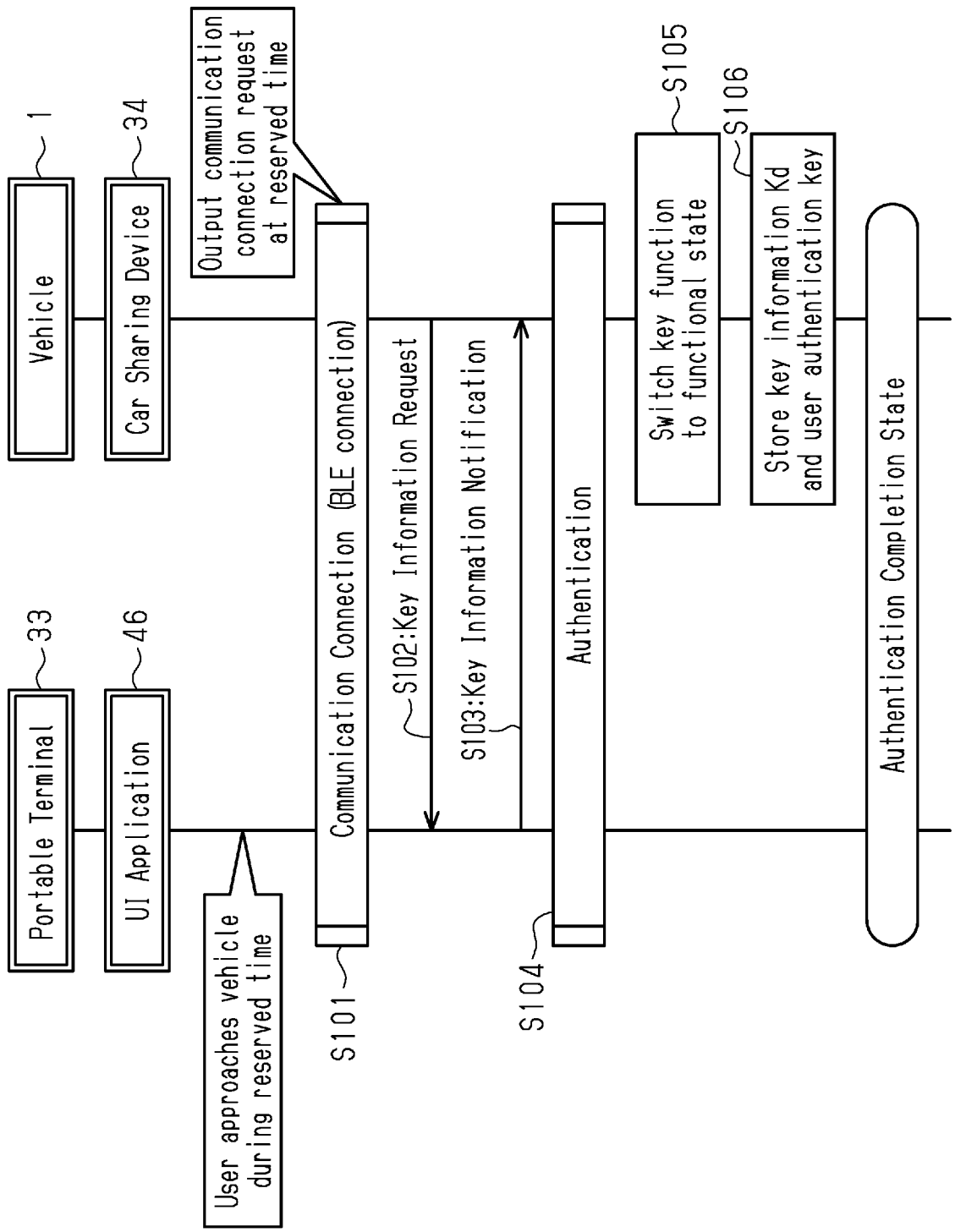
FIG. 2 is a sequence diagram of user authentication.

FIG. 2 illustrates a key information authentication sequence. In this case, an electronic key ID is registered in advance to the memory 13 of the verification ECU 9, and a key-specific encryption code is registered in advance to the memory 53 of the car sharing device 34. Further, key information Kd (one-time key) has been stored in advance in the memory 45 of the portable terminal 33 as a result of an inquiry sent to the server.

In step 101, the sharing processor 47 and the user authentication function unit 57 perform communication connection so as to establish communication between the two through Bluetooth Low Energy (BLE). Specifically, the portable terminal 33 receives an advertisement periodically transmitted from the car sharing device 34. The portable terminal 33 transmits a communication connection request to the car sharing device 34 in response to the reception of the advertisement. The car sharing device 34 transmits acknowledgment of a communication connection to the portable terminal 33 in response to reception of the communication connection request. This establishes BLE communication between the portable terminal 33 and the car sharing device 34.

In step 102, when communication connection (BLE connection) is established, the user authentication function unit 57 transmits, to the portable terminal 33, a key information request for requesting notification of key information Kd that is registered to the portable terminal 33.

In step 103, in response to reception of the key information request from the car sharing device 34, the sharing processor 47 of the portable terminal 33 transmits, to the car sharing device 34, a key information notification that notifies the car sharing device 34 of the key information Kd (request for starting use of car sharing) registered to the portable terminal 33. In this case, the key information Kd transmitted to the car sharing device 34 is encrypted with a predetermined encryption code (e.g., encryption code unique to car sharing device) that is registered to the car sharing system 31.

In step 104, the sharing processor 47 and the user authentication function unit 57 perform authentication using the key information Kd. The authentication includes, for example, determining whether various types of parameters included in the key information Kd are correct as well as determining whether the key information Kd can be correctly decrypted. If the authentication is successful, the process continues. If the authentication fails, connection through BLE communication is stopped.

In step 105, after the authentication is successful, the user authentication function unit 57 switches the key function unit 56 to a functional state (validates key function unit 56). This allows the car sharing device 34 to establish bidirectional communication on the LF-UHF bands with the onboard verification ECU 9.

In step 106, the user authentication function unit 57 stores the key information Kd in the memory 53 of the car sharing device 34. Then, the user authentication function unit 57 completes authentication. When authentication is completed, the car sharing device 34 sets its rental flag to "in use." This allows the car sharing device 34 to lock and unlock the vehicle door and start the engine.

The operation and advantages of the car sharing system 31 according to the embodiment of the present invention will now be described with reference to FIGS. 3 and 4.

Figure 3:
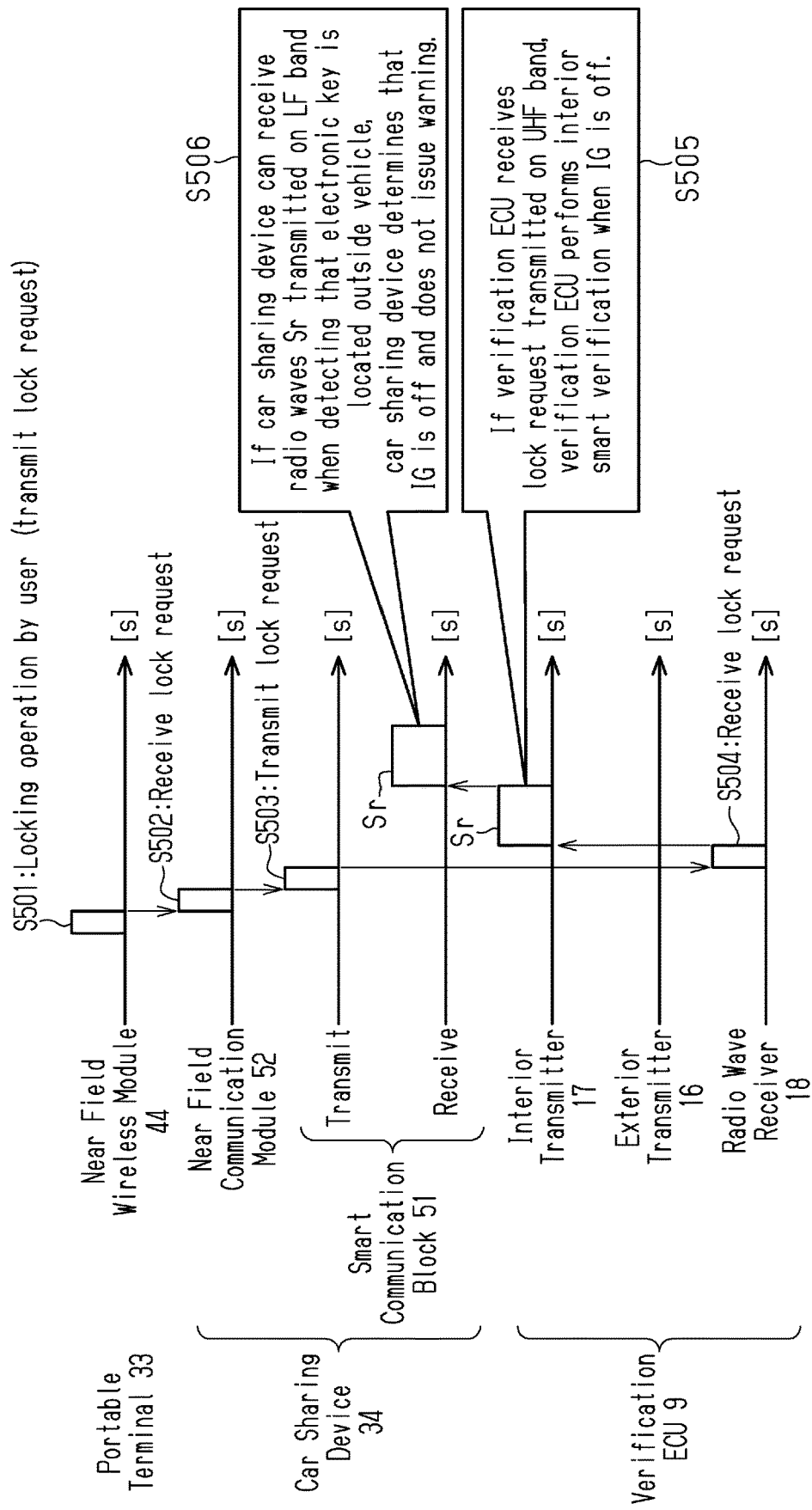
FIG. 3 is a timing diagram illustrating vehicle power supply state determination when IG is off.

FIG. 3 shows the operation of the car sharing system 31 when the vehicle power supply is switched off (IG-off state). In step 501, if the sharing processor 47 detects a locking operation performed by the user with the portable terminal 33, the sharing processor 47 transmits a lock request to the car sharing device 34 as a key control request through near field communication. The lock request of this example is transmitted from the near field wireless module 44 of the portable terminal 33 to the car sharing device 34 through Bluetooth communication.

In step 502, the user authentication function unit 57 receives, with the near field communication module 52, the lock request transmitted from the portable terminal 33. The user authentication function unit 57 has the key function unit 56 perform locking through the electronic key system 4 in response to the reception of the lock request.

In step 503, when the car sharing device 34 receives the lock request transmitted from the portable terminal 33, the key function unit 56 transmits, on the UHF band, a lock request (including electronic key ID), which requests the verification ECU 9 to start the locking, from the smart communication block 51. The radio wave checker 60 monitors whether radio waves Sr transmitted on the LF band from the interior transmitter 17 are received in response to the transmission of the lock request from the smart communication block 51.

In the case shown in FIG. 3, the vehicle power supply is switched off. Thus, the radio wave receiver 18 is functional. Thus, in step 504, the radio wave receiver 18 receives the lock request transmitted from the car sharing device 34.

When the lock request is received from the car sharing device 34 via the radio wave receiver 18, the verification ECU 9 verifies the electronic key ID included in the lock request. If the verification is successful, the verification ECU 9 has the body ECU 10 lock the vehicle door 14. This locks the vehicle door 14. The unlocking of the vehicle door 14 with the portable terminal 33 can be described by merely replacing the term "locking" with the term "unlocking" and thus is excluded from this description.

In step 505, when the verification ECU 9 receives the lock request transmitted on the UHF band from the car sharing device 34, the verification ECU 9 performs interior smart verification with the interior electronic key detection function. The interior smart verification includes key ID verification for determining the authenticity of the electronic key ID and challenge-response authentication using a key-specific encryption code. In this case, the verification ECU 9 transmits radio waves Sr from the interior transmitter 17 to determine whether the interior smart verification is successful. The radio waves Sr may be a wake signal or a challenge-response code.

In step 506 of FIG. 3, after the lock request is transmitted from the smart communication block 51, the radio wave checker 60 receives the radio waves Sr transmitted from the interior transmitter 17 with the interior electronic key detection function and determines that the vehicle power supply is switched off. In this case, the radio wave checker 60 determines that the user has not forgotten to stop the vehicle power supply and does not issue a warning with the warning controller 61. Thus, when locking the vehicle door 14, if the vehicle power supply is switched off, a warning is not output.

FIG. 4 shows the operation of the car sharing system 31 when the vehicle power supply is in the ACC-on state or the IG-on state. The actions in steps 501 to 503 of FIG. 3 are the same as FIG. 3 and will not be described.

In step 507, the vehicle power supply is in the ACC-on state or the IG-on state. Thus, the radio wave receiver 18 is non-functional. Accordingly, even if a lock request is transmitted from the car sharing device 34, the radio wave receiver 18 will not receive the lock request. In this case, since the radio wave receiver 18 cannot receive the lock request, the vehicle door 14 will not be locked and the vehicle door 14 remains unlocked.

In step 508, the verification ECU 9 does not receive the lock request transmitted on the UHF band from the car sharing device 34. Thus, the verification ECU 9 will not determine whether the electronic key 2 has been left in the vehicle. That is, even if a locking operation is performed on the vehicle door 14 with the portable terminal 33, the interior electronic key detection function is not actuated and interior smart verification is not performed.

In step 509, after the lock request is transmitted on the UHF band, if the radio wave checker 60 does not receive radio waves Sr within a fixed period of time, the radio wave checker 60 determines that the vehicle power supply is switched on (ACC-on state, IG-on state). If the radio wave checker 60 determines that the vehicle power supply is switched on, the radio wave checker 60 outputs a warning request to the warning controller 61 to issue a warning indicating that the vehicle power supply has not been stopped. When the warning controller 61 receives the warning request from the radio wave checker 60, the warning controller 61 outputs a warning from the warning units 30, 62 indicating that the vehicle power supply has not been stopped (warning indicating that vehicle door 14 cannot be locked). This notifies the user who is trying to lock the vehicle door 14 that he or she has forgotten to stop the vehicle power supply.

In this example, when the user operates the onboard device 3 with the portable terminal 33, a key control request (lock request) is transmitted from the portable terminal 33 to the car sharing device 34, and the car sharing device 34 cooperates with the electronic key system 4 in accordance with the key control request to actuate the onboard device 3. During the actuation, the car sharing device 34 checks radio waves Sr by using the radio waves Sr transmitted from the electronic key system 4 (interior transmitter 17) in accordance with the state of the vehicle power supply. Thus, even when the user operates the onboard device 3 with the portable terminal 33, the state of the vehicle power supply can be indirectly determined. If detected that one has forgotten to stop the vehicle power supply, a warning is issued to indicate such a situation. This allows the user to be notified that he or she has forgotten to stop the vehicle power supply.

The car sharing device 34 is not wire-connected to the electronic key system 4. The car sharing device 34 performs an actuation action through wireless communication with the electronic key system 4. Thus, the car sharing device 34 can easily be retrofitted to the vehicle 1.

The key control request is a lock request that is a request for locking the vehicle door 14. Thus, the user can check whether the vehicle power supply has been switched off when performing a locking operation on the vehicle door 14 with the portable terminal 33. Thus, the user will not leave the power supply state switched with the vehicle door 14 locked.

Radio waves Sr are transmitted from the onboard interior transmitter 17 when locking the vehicle door 14. Thus, the state of the vehicle power supply is determined using radio waves Sr that are stably formed by the interior transmitter 17 inside the vehicle.

Radio waves Sr are transmitted from the interior transmitter 17 when the vehicle power supply is in the IG-off state. Radio waves Sr are not transmitted from the interior transmitter 17 when the vehicle power supply is in the ACC-on state or the IG-on state. Thus, the car sharing device 34 determines whether the vehicle power supply is in the IG-off state or in the ACC-on state or the IG-on state by checking whether the car sharing device 34 can receive the radio waves Sr transmitted from the interior transmitter 17.

The series of processes for monitoring radio waves Sr and issuing a warning indicating that the vehicle power supply has not been stopped is performed using the interior electronic key detection function included in advance in the electronic key system 4. This allows for detection of a situation in which one has forgotten to stop the vehicle power supply when the user operates the onboard device 3 with the portable terminal 33 without the need to add a new component.

When the user starts the engine 6 of the vehicle 1, the user pushes the engine switch 28 while depressing the brake pedal. If the verification ECU 9 detects the engine starting operation, the verification ECU 9 performs interior smart verification with the car sharing device 34 when authentication has been completed. If the verification ECU 9 determines that the interior smart verification has been successful, the smart verification ECU 9 permits starting of the engine 6. Thus, operation of the engine switch 28 will start the engine 6.

The present embodiment is not limited to the above configuration and may be modified as described below.

The state of the vehicle power supply does not have to be determined from whether radio waves Sr can be received. Radio waves Sr including, for example, a content that is dependent on the state of the vehicle power supply may be transmitted from the interior transmitter 17 so that the state of the vehicle power supply can be determined from the content of the radio waves Sr.

The series of processes for monitoring radio waves Sr and issuing a warning indicating that one has forgotten to stop the vehicle power supply is not limited to the interior electronic key detection function included in advance in the electronic key system 4 and may be performed separately from and independently of the function.

A key control request, which starts the determination of whether one has forgotten to stop the vehicle power supply, is not limited to a lock request and may be changed to other requests such as a request for permission to start the engine or a request for starting the engine.

Radio waves Sr do not need to be transmitted from the interior transmitter 17 and may be transmitted from an onboard antenna.

A warning indicating that one has forgotten to stop the vehicle power supply may be changed to other forms, for example, the portable terminal 33 can be used to notify the user of such a situation.

When the user carrying the portable terminal 33 exits the vehicle, a key control request (not limited to lock request and may be replaced with other requests) may be automatically transmitted at that time from the portable terminal 33 to the car sharing device 34. The presence or absence of radio waves Sr can be checked to determine whether one has forgotten to stop the vehicle power supply.

The key information Kd does not need to be provided after encryption with an encryption code unique to a car sharing device. Other encryption codes may be used when providing the key information Kd.

The content included in the key information Kd may be changed to forms other than that of the embodiment.

The authentication in step 104 (authentication with key information Kd) is not limited to the example described in the embodiment and may be changed to other forms.

The key information Kd does not need to be generated by the server and may be generated anywhere as long as it is outside the vehicle.

The operation-free electronic key system 4 is not limited to a system that arranges transmitters inside and outside a vehicle to perform smart verification while determining where the electronic key 2 is located. The electronic key system 4 may be a system that arranges LF antennas on the right and left of the vehicle body to check a response of the electronic key 2 to the radio waves transmitted from the antennas and determines whether the electronic key is located inside or outside the vehicle.

The electronic key system 4 installed in the vehicle may be a wireless key system in which ID verification is performed in response to a communication from, for example, the electronic key 2.

The electronic key 2 is not limited to a smart key (registered trademark) and may be a wireless key.

The near field communication is not limited to Bluetooth communication and may be changed to other communication protocols.

Communication protocols and frequencies used for various types of communication are not limited to the example described in the embodiment and may be changed.

ID verification applied to the electronic key system 4 is not limited to verification including challenge-response authentication and may include any authentication and verification as long as at least electronic key ID verification is performed.

The key information Kd is not limited to a one-time key and may be information of which usage is restricted.

The encryption code used for cryptographic communication may be any one of an encryption code unique to a car sharing device, a user authentication encryption code, and a key-specific encryption code. The switching of encryption codes used during a process is advantageous for ensuring communication security. An encryption code that is used is not limited to the above codes and may be changed to any of a variety of codes.

Communication between the electronic key system 4 and the car sharing device 34 is not limited to wireless communication and may be wire communication.

The car sharing device 34 can be installed anywhere.

The portable terminal 33 is not limited to a smartphone and may be changed to any of a variety of terminals.

In the car sharing system, key information may be a one-time key of which use is permitted only once. With this structure, key information is used only once so that security is ensured when the vehicle is used.

In the car sharing system, key information may be encrypted with an encryption code unique to each car sharing device. With this structure, key information is transmitted through encrypted communication so that security is ensured when the key information is provided.

In the car sharing system, key information may be generated by a server that manages the sharing of vehicles in network communication. With this structure, key information is securely generated by the server.

The car sharing system may functionally separate cryptographic communication when the key function unit performs ID verification with the electronic key system from cryptographic communication between the user authentication function unit and the portable terminal when the user operates the vehicle with the portable terminal. With this structure, even if an encryption code is stolen from one of the two types of cryptographic communication, the stolen encryption code is not used in the other cryptographic communication. This further ensures security when the vehicle is used.

In the embodiment, the controller 50 (key function unit 56, user authentication function unit 57, radio wave checker 60, warning controller 61) may include one or more dedicated circuits or one or more processors. The controller 50 may include one or more processors and a memory (non-transitory computer-readable storage medium) that stores one or more programs including a group of instructions executable by the processor. The group of instructions, when executed, causes the processor to perform key information authentication a car sharing method according to the present disclosure. The program includes a group of instructions that causes the processor to perform the process for the controller 50 in steps 101 to 106 in the sequence shown in FIG. 2. The program also includes a group of instructions that causes the processor to perform the process for the controller 50 in steps 501 to 509 shown in FIGS. 3 and 4. Accordingly, the present disclosure may provide a non-transitory computer-readable storage medium that stores such a program.

DESCRIPTION OF THE REFERENCE NUMERALS

1 . . . vehicle (shared vehicle), 2 . . . electronic key, 3 . . . onboard device, 4 . . . electronic key system, 14 . . . vehicle door, 17 . . . interior transmitter, 31 . . . car sharing system, 33 . . . portable terminal, 34 . . . car sharing device, 56 . . . key function unit, 57 . . . user authentication function unit, 60 . . . radio wave checker, 61 . . . warning controller, Kd . . . key information, Sr . . . radio waves

The invention claimed is:

1. A car sharing system comprising:
a car sharing device that actuates an onboard device by performing communication with an onboard electronic key system through ID verification when a user operates the onboard device in an authentication completion state in which key information, registered to a portable terminal so that the portable terminal can be actuated as a vehicle key of a shared vehicle, has been authenticated through wireless communication with the portable terminal;
a radio wave checker that checks radio waves transmitted from the electronic key system in accordance with a state of a vehicle power supply when the onboard device is operated with the portable terminal and a key control request corresponding to the operation with the portable terminal is transmitted from the portable terminal to the car sharing device so that the car sharing device actuates the electronic key system; and
a warning controller that issues a warning indicating that one has forgotten to stop the vehicle power supply in accordance with a checking result of the radio wave checker.

2. The car sharing system according to claim 1, wherein the car sharing device is not wire-connected to the electronic key system and actuates the electronic key system through wireless communication.

3. The car sharing system according to claim 1, wherein the key control request is a lock request that is a request for locking a vehicle door.

4. The car sharing system according to claim 1, wherein the radio waves are transmitted from an onboard interior transmitter when a locking operation is performed on a vehicle door.

5. The car sharing system according to claim 4, wherein the radio waves are transmitted from the interior transmitter when the vehicle power supply is in an IG-off state, and the radio waves are not transmitted from the interior transmitter when the vehicle power supply is in an ACC-on state or an IG-on state.

6. The car sharing system according to claim 1, wherein a series of processes for monitoring the radio waves and issuing a warning indicating that one has forgotten to stop the vehicle power supply is performed using an interior electronic key detection function included in advance in the electronic key system.

\* \* \* \* \*